United States Patent [19]

Johnson et al.

[11] Patent Number: 4,877,381
[45] Date of Patent: Oct. 31, 1989

[54] COMPRESSOR SHAFT COLLAR THROUGH PORT FOR PRESSURE EQUALIZATION BETWEEN FLUID POCKETS

[75] Inventors: William C. Johnson, Onsted; Hubert Richardson, Jr., Brooklyn, both of Mich.

[73] Assignee: Tecumseh Products Company, Tecumseh, Mich.

[21] Appl. No.: 193,750

[22] Filed: May 12, 1988

[51] Int. Cl.⁴ .................. F04C 18/04; F04C 29/02; F01M 11/02; F16C 32/06

[52] U.S. Cl. ........................................ 418/55; 418/94; 184/6.18; 384/99; 384/118; 384/369

[58] Field of Search ............... 418/55 R, 55 D, 55 E, 418/57, 88, 94; 184/6.16, 6.18; 384/99, 118, 369

[56] References Cited

U.S. PATENT DOCUMENTS

| | | | |
|---|---|---|---|
| 3,003,684 | 10/1961 | Tarleton | 418/88 |
| 4,473,343 | 9/1984 | Hazaki et al. | 418/55 R |
| 4,502,852 | 3/1985 | Hazaki | 418/55 E |
| 4,637,786 | 1/1987 | Matoba et al. | 418/55 E |
| 4,702,682 | 10/1987 | Inaba et al. | 418/55 E |

FOREIGN PATENT DOCUMENTS 60-164691  8/1985  Japan .................. 418/94

Primary Examiner—John J. Vrablik
Attorney, Agent, or Firm—Albert L. Jeffers; John F. Hoffman; David L. Ahlersmeyer

[57] ABSTRACT

A scroll-type hermetic compressor is disclosed including within a hermetically sealed housing a fixed scroll member, an orbiting scroll member, a main bearing frame member, and a crankshaft. The frame member and fixed scroll member define a suction pressure chamber in which the orbiting scroll member is disposed. The crankshaft includes a plate portion disposed between the orbiting scroll member and a thrust surface of the frame. Oil chambers are disposed within respective interfaces between the orbiting scroll member bottom surface and the plate portion top surface, and the plate portion bottom surface and the frame thrust surface. Oil at discharge pressure from an oil sump is supplied to the oil chambers. The oil chambers communicate with one another via a pressure equalization port extending through the plate portion.

19 Claims, 5 Drawing Sheets

COMPRESSOR SHAFT COLLAR THROUGH PORT FOR PRESSURE EQUALIZATION BETWEEN FLUID POCKETS

BACKGROUND OF THE INVENTION

The present invention relates generally to a hermetic compressor and, more particularly, to such a compressor including a compressor mechanism within a housing, wherein the mechanism is operably driven by a rotatable crankshaft having an axial shaft portion and a radially extending plate portion. The plate portion typically functions as a counterweight and/or a crankshaft thrust collar.

More specifically, the present invention relates to a hermetic compressor including within a housing a compressor mechanism, i.e., a scroll compressor mechanism, wherein the crankshaft experiences axial loading due to various forces acting thereon, including the weight of the crankshaft. Axial loading of the crankshaft can cause damage to crankshaft supporting thrust surfaces or, alternatively, require expensive thrust bearings to avoid such damage. In the case of a crankshaft exposed entirely to atmosphere, crankshaft balancing is not necessary. However, in hermetic compressors wherein the crankshaft is subjected to internal pressures of the compressor, the crankshaft is typically balanced by exposing equal and opposite areas of the crankshaft to equal pressures.

The aforementioned axial loading and corrective balancing of a crankshaft presents special problems in the case of a hermetic scroll-type compressor. A typical scroll compressor comprises two facing scroll members, each having an involute wrap, wherein the respective wraps interfit to define a plurality of closed pockets. When one of the scroll members, i.e., the orbiting scroll member, orbits relative to the other, the pockets travel to compress and convey refrigerant fluid from a suction pressure chamber to a discharge pressure chamber. During operation of a scroll-type compressor, the pressure of compressed refrigerant at the interface between the scroll members tends to force the scroll members axially apart. Consequently, axial compliance of the orbiting scroll member toward the fixed scroll member is required. In many instances, this involves exposing the bottom side of the orbiting scroll member to fluids at the various pressure levels existing within the housing. This can cause additional axial loading on the crankshaft if care is not taken to assure crankshaft balancing.

One axial compliance mechanism used in scroll compressors for applying an axial compliance force to the orbiting scroll member involves providing an intermediate pressure chamber defined by the bottom of the orbiting scroll member and a frame member. In such a system, the crankshaft plate portion may be entirely enclosed within the intermediate chamber, thereby exposing the top and bottom surfaces of the plate portion to substantially the same pressure, i.e., zero net axial force. However, other axial compliance mechanisms exist that expose the top and bottom surfaces of the plate portion to separate pockets of fluid. In such a system, even though the separate pockets may be supplied fluid from a common source, fluid feed and outlet paths associated with the individual pockets may result in slightly different pressures, i.e., a net axial force on the plate portion. The aforementioned pressure differences are unpredictable and, therefore, make crankshaft balancing more difficult.

A further problem associated with crankshafts having a radially extending plate portion is that flow of lubricating oil along the axial length of shaft portion of the crankshaft, either for delivery or venting, may be interrupted by the plate portion. Such a condition in scroll compressors can lead to introduction of excessive oil into the refrigeration system, thereby causing system inefficiencies.

The present invention is directed to overcoming the aforementioned problems associated with a compressor oil delivery system, wherein it is desired to provide improved axial balancing of a crankshaft having a radially extending plate portion.

SUMMARY OF THE INVENTION

The present invention overcomes the problems and disadvantages of the above-described prior art compressors by providing improved axial balancing for a crankshaft having a radially extending plate portion in a hermetic compressor, wherein fluid communication is provided between pockets of fluid exposed to the top and bottom surfaces of the plate portion, respectively, whereby substantial pressure equalization is achieved between the top and bottom pockets of fluid.

Generally, the present invention provides a hermetically sealed compressor comprising a housing including therein a compressor mechanism driven by a rotatable crankshaft. The crankshaft includes a shaft portion and a radially extending plate portion having a top surface and a bottom surface. Pockets of fluid are exposed to the top and bottom surfaces imparting axial forces thereto. The pressure of the fluid in the top and bottom pockets is made substantially equal by providing fluid communication through the crankshaft between the top and bottom pockets of fluid. The invention, in one form thereof, provides an axial port extending through the plate portion between an opening on the top surface and an opening on the bottom surface.

An advantage of the compressor of the present invention is that axial balancing of a crankshaft in a hermetic compressor is more easily achieved.

Another advantage of the compressor of the present invention is that delivery of fluid to separate pockets exposed to the top and bottom surfaces of the plate portion can be accomplished without as much concern for pressure variations, because pressure equalization can now occur after delivery to the pockets.

A further advantage of the compressor of the present invention is that a simple method of equalizing the pressure of fluids exposed to the top and bottom surfaces of the plate portion of a crankshaft is provided.

Yet another advantage of the compressor of the present invention is that axial flow of oil along the shaft portion of the crankshaft is not impeded by the plate portion of the crankshaft.

A still further advantage of the compressor of the present invention is that pressure build-up of fluid on either side of the plate portion of a crankshaft is substantially eliminated.

Another advantage of the compressor of the present invention is that axial compliance in a hermetic scroll compressor is more easily accomplished by the provision of a way to equalize pressure between fluid exposed to each side of the plate portion of the crankshaft.

The compressor of the present invention, in one form thereof, provides a housing and a compressor mechanism within the housing for compressing refrigerant fluid. The compressor mechanism is drivingly engaged by a rotatable crankshaft. The crankshaft includes an axial shaft portion and a radially extending plate portion. A first pocket of fluid is located adjacent a top surface of the plate portion, while a second pocket of fluid is located adjacent a bottom surface of the plate portion. The crankshaft also includes a port for providing fluid communication between the first pocket and the second pocket, whereby the first and second pockets are at substantially equal pressures.

The invention further provides, in one form thereof, a hermetic scroll compressor including a housing and a scroll compressor mechanism within the housing. The compressor mechanism includes a frame member having a thrust surface, and an orbiting scroll member having a bottom surface. The compressor also includes a rotatable crankshaft operably engaged with the orbiting scroll member to impart orbiting motion thereto. The crankshaft includes an axial shaft portion and a radially extending plate portion having a top surface and a bottom surface. The plate portion is disposed intermediate the orbiting scroll member bottom surface and the frame member thrust surface. A first pocket is defined by the orbiting scroll member bottom surface and the plate portion top surface. Likewise, a second pocket is defined by the plate portion bottom surface and the frame member thrust surface. The first and second pockets have fluid therein exposed to the plate portion top and bottom surfaces, respectively. A port is provided that extends through the plate portion from a top opening on the top surface to a bottom opening on the bottom surface. Accordingly, the respective pressures of fluid exposed to the top and bottom surfaces are substantially equal.

The present invention further provides, in one form thereof, a hermetic scroll compressor including a housing having a discharge pressure chamber therein. An oil sump is located within the discharge pressure chamber. The compressor also includes a scroll compressor mechanism within the housing, wherein the mechanism includes a frame member having a thrust surface, and an orbiting scroll member having a bottom surface. A rotatable crankshaft engages the orbiting scroll member to impart orbiting motion thereto. The crankshaft includes an axial shaft portion rotatably supported by the frame, and a radially extending plate portion disposed intermediate the orbiting scroll member bottom surface and the frame member thrust surface. The plate portion has a top surface and a bottom surface. Oil at discharge pressure from the oil sump is delivered to a first oil-receiving pocket defined by the orbiting scroll member bottom surface and the plate portion top surface. Similarly, a second oil-receiving pocket is defined by the plate portion bottom surface and the frame member thrust surface, to which oil is delivered from the oil sump. The crankshaft includes a fluid communication passage between the first pocket and the second pocket.

DESCRIPTION OF THE PREFERRED EMBODIMENT

Figure 1:
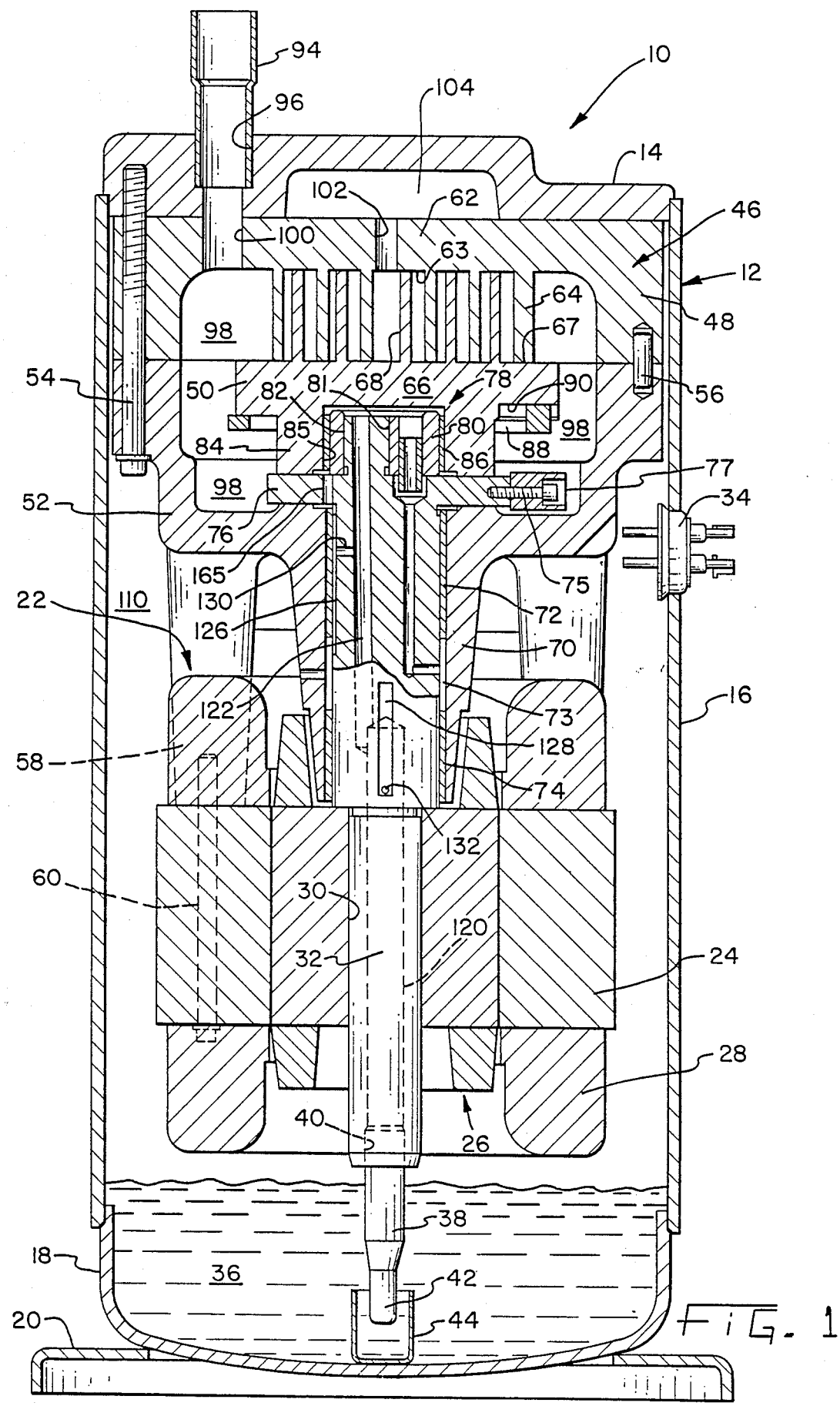
FIG. 1 is a longitudinal sectional view of a compressor of the type to which the present invention pertains, taken along the line 1—1 in FIG. 3 and viewed in the direction of the arrows.
Figure 2:
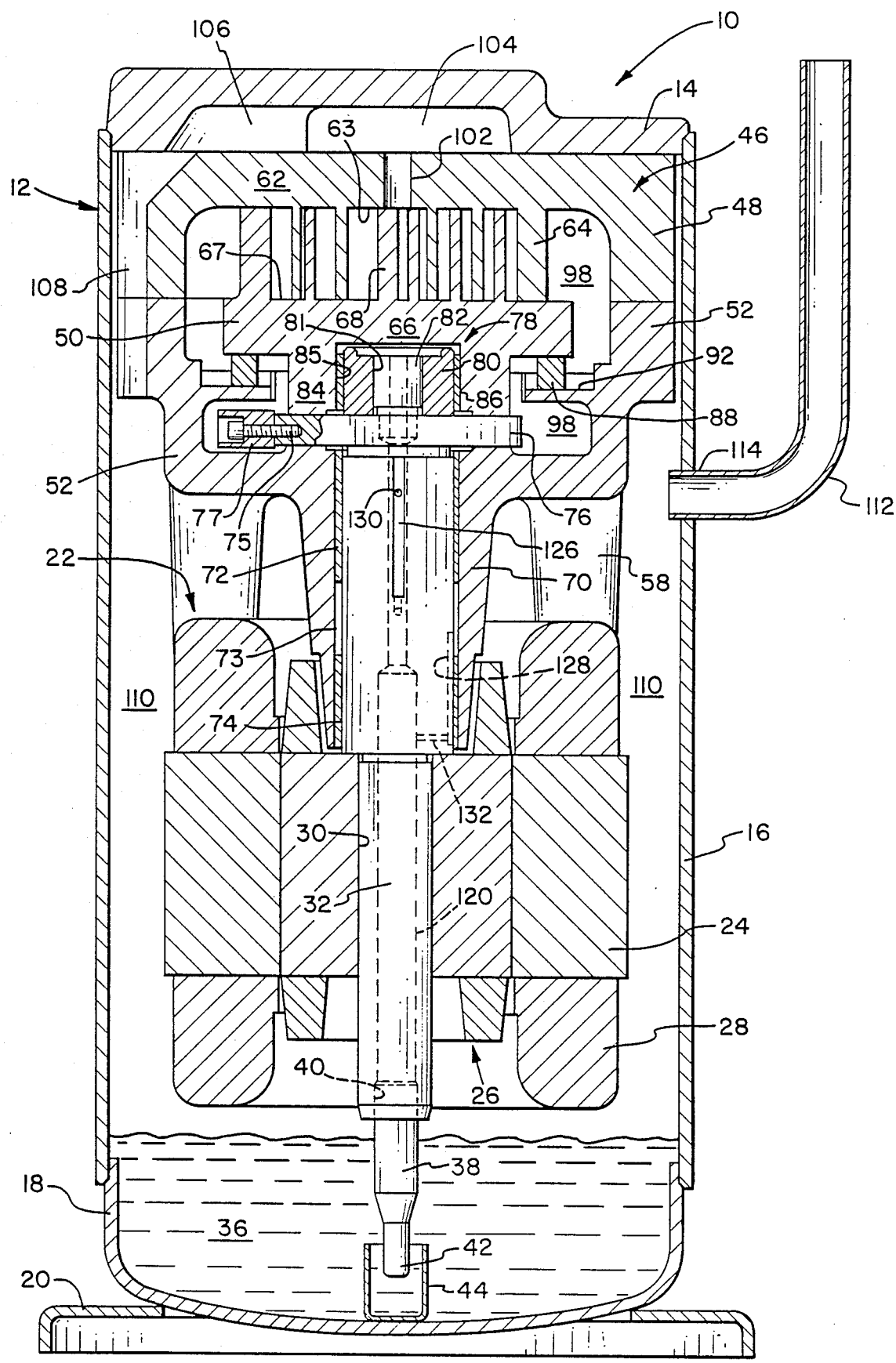
FIG. 2 is a longitudinal sectional view of the compressor of FIG. 1, taken along the line 2—2 in FIG. 3 and viewed in the direction of the arrows.
Figure 3:
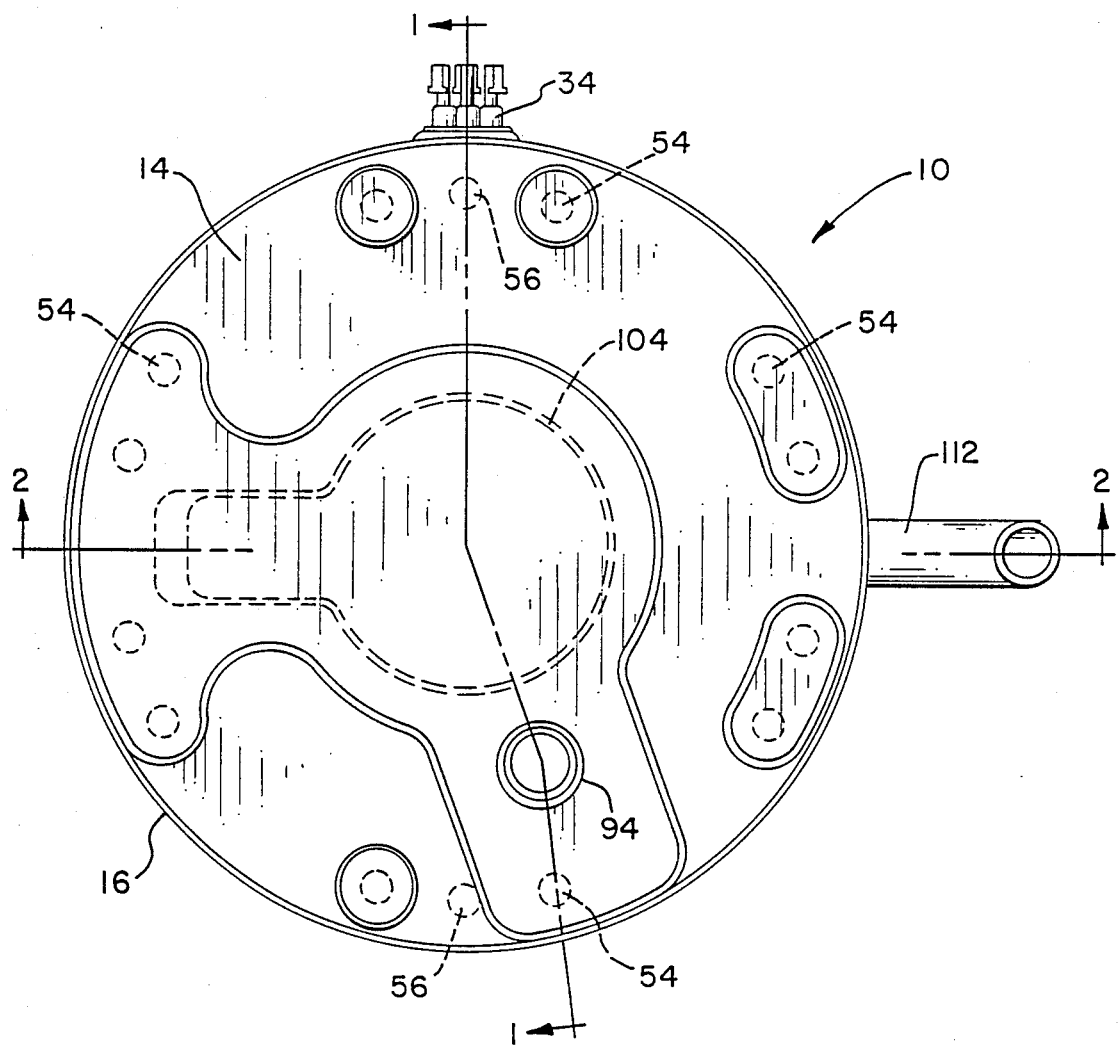
FIG. 3 is an enlarged top view of the compressor of FIG. 1.

In an exemplary embodiment of the invention as shown in the drawings, and in particular by referring to FIGS. 1—3, a compressor 10 is shown having a housing generally designated at 12. The housing has a top cover plate 14, a central portion 16, and a bottom portion 18, wherein central portion 16 and bottom portion 18 may alternatively comprise a unitary shell member. The three housing portions are hermetically secured together as by welding or brazing. A mounting flange 20 is welded to bottom portion 18 for mounting the compressor in a vertically upright position. Located within hermetically sealed housing 12 is an electric motor generally designated at 22, having a stator 24 and a rotor 26. Stator 24 is provided with windings 28. Rotor 26 has a central aperture 30 provided therein into which is secured a crankshaft 32 by an interference fit. A terminal cluster 34 is provided in central portion 16 of housing 12 for connecting motor 22 to a source of electric power.

Compressor 10 also includes an oil sump 36 generally located in bottom portion 18. A centrifugal oil pickup tube 38 is press fit into a counterbore 40 in the lower end of crankshaft 32. Oil pickup tube 38 is of conventional construction and includes a vertical paddle (not shown) enclosed therein. An oil inlet end 42 of pickup tube 38 extends downwardly into the open end of a cylindrical oil cup 44, which provides a quiet zone from which high quality, non-agitated oil is drawn.

Compressor 10 includes a scroll compressor mechanism 46 enclosed within housing 12. Compressor mechanism 46 generally comprises a fixed scroll member 48, an orbiting scroll member 50, and a main bearing frame member 52. As shown in FIG. 1, fixed scroll member 48 and frame member 52 are secured together and are attached to top cover plate 14 by means of a plurality of mounting bolts 54. Precise alignment between fixed scroll member 48 and frame member 52 is accomplished by a pair of locating pins 56. Frame member 52 includes a plurality of mounting pads 58 to which motor stator 24 is attached by means of a plurality of mounting bolts 60, such that there is an annular gap between stator 24 and rotor 26.

Fixed scroll member 48 comprises a generally flat face plate 62 having a face surface 63, and an involute fixed wrap 64 extending axially from surface 63. Likewise, orbiting scroll member 50 comprises a generally flat face plate 66 having a top face surface 67, and an involute orbiting wrap 68 extending axially from surface 67. Fixed scroll member 48 and orbiting scroll member 50 are assembled together so that fixed wrap 64 and orbiting wrap 68 operatively interfit with each other. Furthermore, face surfaces 63, 67 and wraps 64, 68 are manufactured or machined such that, during compressor operation when the fixed and orbiting scroll members are forced axially toward one another, the tips of wraps 64, 68 sealingly engage with respective opposite face surfaces 67, 63.

Main bearing frame member 52, as shown in FIGS. 1 and 2, comprises a downwardly extending bearing portion 70. Retained within bearing portion 70, as by press fitting, is a conventional sleeve bearing assembly comprising an upper bearing 72 and a lower bearing 74. Two sleeve bearings are preferred rather than a single longer sleeve bearing to facilitate easy assembly into bearing portion 70 and to provide an annular space 73 between the two bearings 72, 74. Accordingly, crankshaft 32 is rotatably journalled within bearings 72, 74.

Crankshaft 32 includes a concentric thrust plate 76 extending radially outwardly from the sidewall of crankshaft 32. A balance weight 77 is attached to thrust plate 76, as by bolts 75. Situated on the top of crankshaft 32 is an eccentric crank mechanism 78. According to a preferred embodiment, crank mechanism 78 comprises a cylindrical roller 80 having an axial bore 81 extending therethrough at an off-center location. An eccentric crankpin 82, constituting the upper, offset portion of crankshaft 32, is received within bore 81, whereby roller 80 is eccentrically journalled about eccentric crankpin 82. Orbiting scroll member 50 includes a lower hub portion 84 that defines a cylindrical well 85 into which a roller 80 is received. Roller 80 is journalled for rotation within well 85 by means of a sleeve bearing 86, which is press fit into well 85. Each of sleeve bearings 72, 74, and 86 is preferably a steel-backed bronze bushing.

When crankshaft 32 is rotated by motor 22, the operation of eccentric crankpin 82 and roller 80 within well 85 causes orbiting scroll member 50 to orbit with respect to fixed scroll member 48. Roller 82 pivots slightly about crankpin 80 so that crank mechanism 78 functions as a conventional swing-link radial compliance mechanism to promote sealing engagement between fixed wrap 64 and orbiting wrap 68. Orbiting scroll member 50 is prevented from rotating about its own axis by means of a conventional Oldham ring assembly, comprising an Oldham ring 88, and Oldham key pairs 90, 92 associated with orbiting scroll member 50 and frame member 52, respectively.

In operation of compressor 10 of the preferred embodiment, refrigerant fluid at suction pressure is introduced through suction pipe 94, which is received within a counterbore 96 in top cover plate 14 and is attached thereto as by silver soldering or brazing. A suction pressure chamber 98 is generally defined by fixed scroll member 48 and frame member 52. Refrigerant is introduced into chamber 98 from suction tube 94 through a suction passageway 100 defined by aligned holes in top cover plate 14 and fixed scroll member 48. As orbiting scroll member 50 is caused to orbit, refrigerant fluid within suction pressure chamber 98 is compressed radially inwardly by moving closed pockets defined by fixed wrap 64 and orbiting wrap 68.

Refrigerant fluid at discharge pressure in the innermost pocket between the wraps is discharged upwardly through a discharge port 102 communicating through face plate 62 of fixed scroll member 48. Compressed refrigerant discharged through port 102 enters a discharge plenum chamber 104 defined by the underside of top cover plate 14. A radially extending duct 106 formed in top cover plate 14 and an axially extending duct 108 extending along the side of fixed scroll member 48 and frame member 52 allow the compressed refrigerant in discharge plenum chamber 104 to be introduced into housing chamber 110 defined within housing 12. As shown in FIG. 2, a discharge tube 112 extends through central portion 16 of housing 12 and is sealed thereat as by silver solder 114. Discharge tube 112 allows pressurized refrigerant within housing chamber 110 to be delivered to the refrigeration system (not shown) in which compressor 10 is incorporated.

Figure 4:
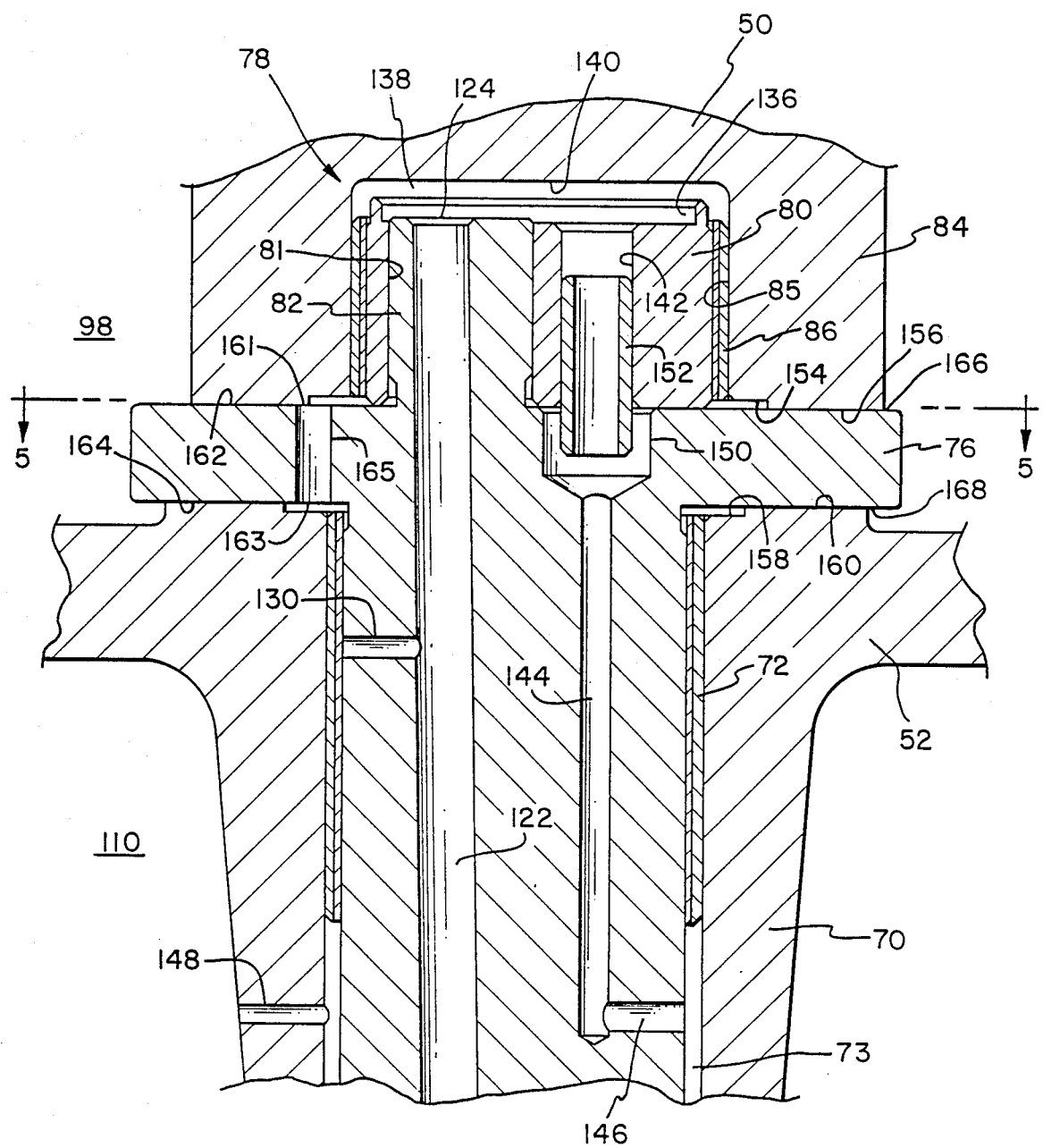
FIG. 4 is an enlarged fragmentary sectional view of the compressor of FIG. 1.

Reference will now be made to FIGS. 1, 2, and 4 for a general discussion of the lubrication system of compressor 10. An axial oil passageway 120 is provided in crankshaft 32, which communicates with tube 38 and extends upwardly along the central axis of crankshaft 32. At a central location along the length of crankshaft 32, an offset, radially divergent oil passageway 122 intersects passageway 120 and extends to an opening 124 on the top of eccentric crankpin 82 at the top of crankshaft 32. As crankshaft 32 rotates, oil pickup tube 38 draws lubricating oil from oil sump 36 and causes oil to move upwardly through oil passageways 120 and 122. As shown in FIGS. 1 and 2, lubrication of upper bearing 72 and lower bearing 74 is accomplished by means of flats 126 and 128 in crankshaft 32, located in the general vicinity of bearings 72 and 74, respectively. Flat 126 communicates with offset oil passageway 122 by means of a radial passage 130, while flat 128 communicates with axial oil passageway 120 by means of a radial passage 132. As illustrated in FIGS. 1 and 2, flats 126 and 128 extend axially along the length of crankshaft 32, and are located relative to bearings 72 and 74 so as to overlap and communicate with annular space 73.

Referring now to FIG. 4, lubricating oil pumped upwardly through offset oil passageway 122 exits crankshaft 32 through opening 124 located on the top of eccentric crankpin 82. A counterbore 136 in the top surface of roller 80 provides a reservoir into which oil from hole 124 is introduced. Lubricating oil within counterbore 136 will tend to flow downwardly along the interface between bore 81 and crankpin 82 for lubrication thereof. A flat on crankpin 82 (not shown) may be provided to enhance lubrication.

Lubrication delivered from hole 124 not only fills counterbore 136, but also fills a chamber 138 within well 85, defined by bottom surface 140 of well 85 and the top surface of crank mechanism 78, including roller 80 and crankpin 82. Oil within chamber 138 tends to flow downwardly along the interface between roller 80 and sleeve bearing 86 for lubrication thereof. A flat (not shown) may be provided in the outer cylindrical surface of roller 80 to enhance lubrication.

The lubrication system of compressor 10 further includes a vent for returning the oil that is pumped from sump 36 to counterbore 136 and chamber 138, back to sump 36. Specifically, an axially extending vent bore 142 is provided in roller 80, which provides communication between the top and bottom surfaces thereof. An axial vent passageway 144 extends axially through crankshaft 32 from the top surface of thrust plate 76 to a location along the length of crankshaft 32 adjacent annular space 73. A radial vent passageway 146 extends radially from axial passageway 144 to an outer surface of crankshaft 32 partially defining annular space 73. Furthermore, a vent hole 148 is provided through bearing portion 70 to provide communication between annular space 73 and housing chamber 110.

During venting of the lubrication system of compressor 10, lubricating oil is pumped upwardly through axial oil passageway 120 and offset oil passageway 122 by the operation of centrifugal oil pick-up tube 38. Upon leaving passageway 122 through opening 124, the oil collects in counterbore 136 and chamber 138 and is also vented downwardly through vent bore 142. Vent bore 142 is generally aligned with the upper portion of axial vent passageway 144 at the interface between roller 80 and thrust plate 76. Therefore, oil flowing downwardly through vent bore 142 continues to flow through vent passageway 144, and then radially outwardly into annular space 73 through radial vent passageway 146. Oil contained within annular space 73, whether deposited there as the result of venting or as the result of the previously described lubrication of bearing 72 and 74, is metered back into housing chamber 110 through vent hole 148.

As discussed previously with respect to the swing-link radial compliance mechanism of the preferred embodiment, roller 80 pivots slightly with respect to crankpin 82 to effect radial compliance of orbiting scroll member 50 against fixed scroll member 48. Accordingly, in order to maintain generally aligned communication between vent bore 142 and axial vent passageway 144, the upper portion of passageway 144 adjacent the top surface of thrust plate 76 comprises a pocket 150 having a diameter greater than that of vent bore 142. In this manner, roller 80 may experience limited pivotal motion while maintaining fluid communication between vent bore 142 and axial vent passageway 144. As shown in FIG. 4, a hollow roll pin 152 is press fit into vent bore 142 and extends from the bottom of roller 80 into the void defined by pocket 150. Oil may continue to flow through roll pin 152 to maintain fluid communication between vent bore 142 and axial passageway 144, however, roller 80 is restrained from pivoting completely about crankpin 82. This restraint against pivoting is used primarily during assembly to keep roller 80 within a range of positions to ensure easy assembly of orbiting scroll member 50 and fixed scroll member 48.

Referring now to FIG. 4 for a description of the axial compliance mechanism of compressor 10, lubricating oil at discharge pressure is provided by the aforementioned lubrication system to the underside of orbiting scroll member 50 within well 85 thereof. More specifically, when the lubricating oil fills chamber 138, an upward force acts upon orbiting scroll member 50 toward fixed scroll member 48. The magnitude of the upward force is determined by the surface area of bottom surface 140. In order to increase the upward force on orbiting scroll member 50, a shallow counterbore 154 is provided in a bottom surface 156 of orbiting scroll member 50 immediately adjacent, i.e., circumjacent, the opening of well 85. Counterbore 154 provides additional surface area on bottom surface 156 to which lubricating oil at discharge pressure may be exposed to create an upward force on orbiting scroll member 50.

In order to keep the forces acting on crankshaft 32 essentially at equilibrium, i.e., exposing equal areas of the top and bottom of the crankshaft to fluid at the same pressure, a counterbore 158 is provided in a top surface 160 of main bearing frame member 52 immediately adjacent, i.e., circumjacent, the opening of bearing portion 70. In this manner, equal areas of a top surface 162 and a bottom surface 164 of thrust plate 76 are exposed to the lubricating oil at discharge pressure within counterbore 154 and counterbore 158, respectively. Additionally, a pressure equalization port 165 is provided in thrust plate 76 to insure that the oil within counterbores 154 and 158 is at the same pressure. Port 165 extends between an opening 161 on top surface 162 and an opening 163 on bottom surface 164, and provides communication between counterbores 154 and 158.

Pressure equalization port 165, according to the preferred embodiment, insures that the annular pocket of fluid within counterbore 154 is at substantially the same pressure as the separated annular pocket of fluid within counterbore 158. Despite being supplied oil from a common source, i.e., oil sump 36, a pressure difference between counterbores 154, 158 can result from their different oil delivery and venting paths. For instance, without port 165, oil to counterbore 158 would be primarily supplied from radial passage 130, upwardly through flat 126 along upper bearing 126. Likewise, oil to counterbore 154 is primarily supplied from oil flowing downwardly along the interface between roller 80 and sleeve bearing 86. The provision of pressure equalization port 165 allows flow of oil between counterbores 154, 158, as necessary, to equalize the fluid pressure therebetween.

It will be appreciated that, while counterbores 154, 158 and pressure equalization port 165 have been described such that equal axial forces are produced on top surface 162 and bottom surface 164, counterbores 154, 158 may be of different sizes so as to expose different areas of top and bottom surfaces 162, 164 to fluid at substantially equal pressure, thereby producing a net upward or downward force. For example, the weight of the crankshaft and attached rotor could be opposed by a force created by making bottom counterbore 158 larger than top counterbore 154.

In one embodiment of compressor 10, particularly shown in FIG. 4, the lubricating oil at discharge pressure within counterbores 154, 158 is sealingly separated from suction pressure chamber 98, located radially outwardly therefrom, by slightly leaky hydrodynamic seals comprising top interface 166 defined by closely spaced top surface 162 and bottom surface 156, and bottom interface 168 defined by closely spaced bottom surface 164 and top surface 160, respectively. In order to achieve the desired hydrodynamic seal, the respective top and bottom surfaces should be machined flat and the clearance within interfaces 166 and 168 should be maintained between 0.0001 and 0.0005 inches. Alternatively, an annular seal element may be disposed within each of the interfaces 166 and 168, thereby permitting greater clearances within the interfaces.

Figure 5:
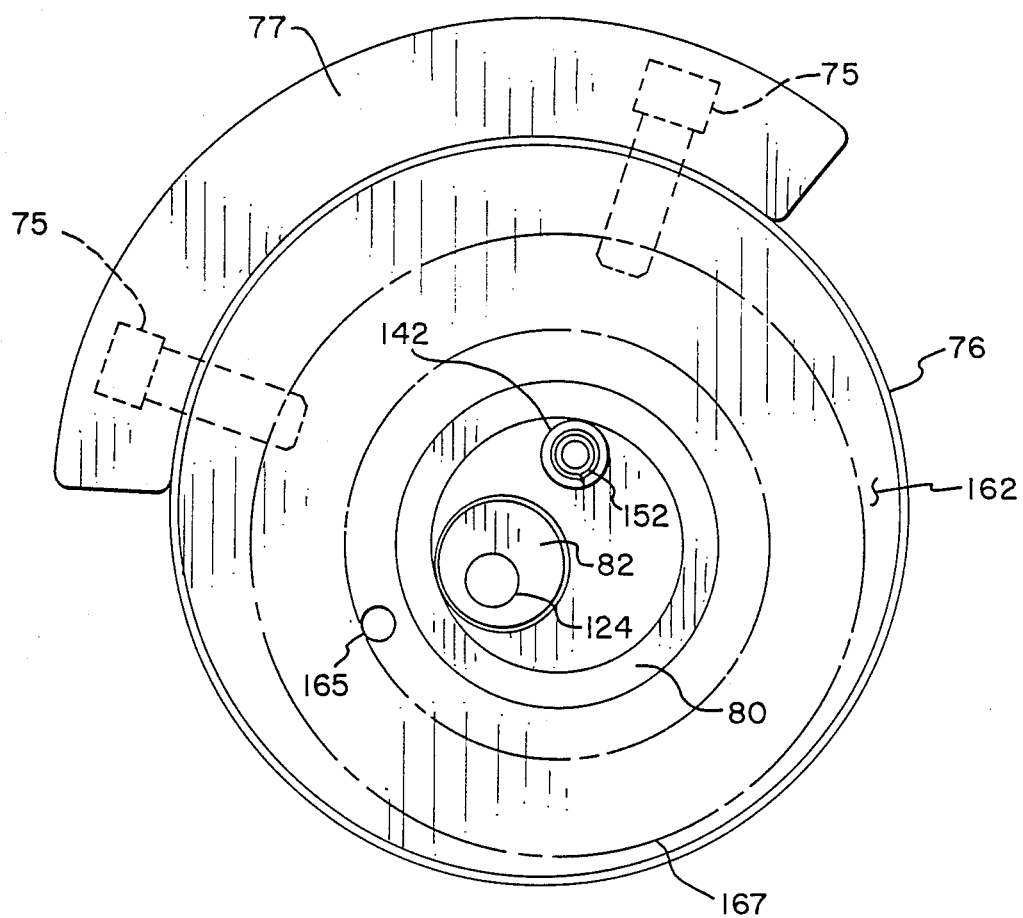
FIG. 5 is an enlarged fragmentary sectional view of the compressor of FIG. 1, taken along the line 5—5 in FIG. 4 and viewed in the direction of the arrows, particularly showing the location of the pressure equalization port on the top surface of the crankshaft thrust plate.

FIG. 5 illustrates the orientation of equalization port 165 on top surface 162 of thrust plate 76. More specifically, pressure equalization port 165 is shown radially positioned between roller 80 and the aforementioned hydrodynamic seal comprising top interface 166. A projection of interface 166 onto top surface 162 is represented by ringed area 167, delineated by phantom lines in FIG. 5. Accordingly, lubricating oil at discharge pressure is retained radially inward from interface 166.

It will be appreciated that the foregoing description of various embodiments of the invention is presented by way of illustration only and not by way of any limitation, and that various alternatives and modifications may be made to the illustrated embodiments without departing from the spirit and scope of the invention.

What is claimed is:
1. A hermetic compressor, comprising:
a housing;
compressor means within said housing for compressing refrigerant fluid;

a rotatable crankshaft including an axial shaft portion and a radially extending plate portion, said plate portion having a top surface and a bottom surface;

a first annular pocket of fluid adjacent said top surface and a second annular pocket of fluid adjacent said bottom surface, said first and second pockets being circumjacent said shaft portion, the radially outermost boundary of each of said first and second pockets being radially inward from a perimeter edge of said plate portion; and pressure equalization means in said crankshaft for providing fluid communication between said first pocket and said second pocket such that said first and second pockets of fluid are at substantially equal pressures.

2. The compressor of claim 1 in which:

said pressure equalization means comprises a port extending through said plate portion between a top opening on said top surface and a bottom opening on said bottom surface.

3. The compressor of claim 2 in which:

said port is substantially radially between said shaft portion and said radially outermost boundary of each of said first and second pockets.

4. The compressor of claim 1, and further comprising:

an oil sump within said housing; and means for delivering oil from said oil sump to said first pocket and to said second pocket.

5. The compressor of claim 1, and further comprising:

a pair of opposing thrust surfaces, said plate portion being intermediate said pair of thrust surfaces, said top and bottom pockets being defined by each of said plate portion top and bottom surfaces and a respective one of said pair of thrust surfaces, respectively.

6. The compressor of claim 1 in which:

said crankshaft is vertically oriented, and substantially equal surface areas of said plate portion top and bottom surfaces are exposed to said first and second pockets, respectively.

7. The compressor of claim 1, and further comprising:

a discharge pressure chamber within said housing;

an oil sump within said discharge pressure chamber; and means for delivering oil from said oil sump to said first pocket and said second pocket at a radially inner location of said first and second pockets adjacent said shaft portion.

8. A hermetic scroll compressor, comprising:

a housing;

a scroll compressor mechanism within said housing, said mechanism comprising a frame member having a thrust surface, and an orbiting scroll member having a bottom surface;

a rotatable crankshaft operably engaged with said orbiting scroll member to impart orbiting motion thereto, said crankshaft including an axial shaft portion and a radially extending plate portion having a top surface and a bottom surface, said plate portion being disposed intermediate said orbiting scroll member bottom surface and said frame member thrust surface;

a first pocket defined by said orbiting scroll member bottom surface and said plate portion top surface, and a second pocket defined by said plate portion bottom surface and said frame member thrust surface, said first and second pockets having fluid therein exposed to said plate portion top and bottom surfaces, respectively; and a port extending through said plate portion from a top opening on said top surface to a bottom opening on said bottom surface, whereby the respective pressures of fluid exposed to said top and bottom surfaces are substantially equal.

9. The scroll compressor of claim 8, and further comprising:

an oil sump within said housing; and means for delivering oil from said oil sump into said first pocket and into said second pocket.

10. The scroll compressor of claim 9 in which:

said housing includes a discharge pressure chamber within which said oil sump is located; and said means for delivering oil includes oil passage means for providing fluid communication between said oil sump and a radially inner portion of said first and second pockets adjacent said shaft portion.

11. The scroll compressor of claim 8 in which:

said first and second pockets are annular and are circumjacent said shaft portion, the radially outermost boundary of each of said first and second pockets being radially inward from a perimeter edge of said plate portion.

12. The scroll compressor of claim 11 in which:

said axial port is substantially radially between said shaft portion and said radially outermost boundary of each of said first and second pockets.

13. The scroll compressor of claim 11 in which:

said outermost boundary of said first and second pockets comprises a first seal intermediate said orbiting scroll member bottom surface and said plate portion top surface, and a second seal intermediate said plate portion bottom surface and said frame member thrust surface, respectively.

14. The scroll compressor of claim 13 in which:

said axial port is located substantially radially inwardly from said first and second seals.

15. A hermetic scroll compressor, comprising:

a housing including a discharge pressure chamber therein;

an oil sump within said discharge pressure chamber;

a scroll compressor mechanism within said housing, said mechanism including a frame member having a thrust surface, and an orbiting scroll member having a bottom surface;

a rotatable crankshaft operably engaged with said orbiting scroll member to impart orbiting motion thereto, said crankshaft including an axial shaft portion rotatably supported by said frame, and a radially extending plate portion disposed intermediate said orbiting scroll member bottom surface and said frame member thrust surface, said plate portion having a top surface and a bottom surface;

means for delivering oil at discharge pressure from said oil sump to a first oil-receiving pocket defined by said orbiting scroll member bottom surface and said plate portion top surface, and to a second oil-receiving pocket defined by said plate portion bottom surface and said frame member thrust surface; and fluid communication means in said crankshaft for providing fluid communication between said first pocket and said second pocket.

16. The scroll compressor of claim 15 in which:

said fluid communication means comprises an axial port extending through said plate portion between a top opening on said top surface and a bottom opening on said bottom, surface.

17. The scroll compressor of claim 15 in which:
said first oil-receiving pocket is defined at a radially outermost boundary by a first seal intermediate said orbiting scroll member bottom surface and said plate portion top surface, and said second oil-receiving pocket is defined at a radially outermost boundary by a second seal intermediate said plate portion bottom surface and said frame member thrust surface.

18. The scroll compressor of claim 17 in which:
said axial port is located substantially radially inwardly from said first and second seals.

19. The scroll compressor of claim 15 in which:
said means for delivering oil includes oil passage means for providing fluid communication between said oil sump and a radially inner portion of said first and second pockets adjacent said shaft portion.

* * * * *